(12) United States Patent
Fustino et al.

(10) Patent No.: US 10,117,009 B1
(45) Date of Patent: Oct. 30, 2018

(54) PORTABLE LOUDSPEAKERS

(71) Applicant: Bose Corporation, Framingham, MA (US)

(72) Inventors: David J. Fustino, Charlestown, MA (US); Jeremy Heaston, Ashland, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/616,565

(22) Filed: Jun. 7, 2017

Related U.S. Application Data

(60) Provisional application No. 62/482,437, filed on Apr. 6, 2017.

(51) Int. Cl.
*H04R 1/02* (2006.01)
*H04R 1/28* (2006.01)
*H04R 25/00* (2006.01)

(52) U.S. Cl.
CPC ............ *H04R 1/026* (2013.01); *H04R 1/023* (2013.01); *H04R 1/025* (2013.01); *H04R 1/2834* (2013.01)

(58) Field of Classification Search
CPC ........ H04R 1/026; H04R 1/023; H04R 1/025; H04R 1/2834
USPC .......................... 381/334, 301, 311; 224/219
See application file for complete search history.

(56) References Cited

U.S. PATENT DOCUMENTS

| | | | | |
|---|---|---|---|---|
| 7,048,277 B1 * | 5/2006 | Schmeichel | ............. | B60J 7/102 296/100.11 |
| 2009/0136076 A1 * | 5/2009 | Chi | ........................ | H04R 1/026 381/387 |
| 2010/0016037 A1 | 1/2010 | Maytum et al. | | |
| 2011/0123038 A1 | 5/2011 | Clark | | |
| 2012/0081852 A1 * | 4/2012 | Maravilla | ................. | A45F 5/00 361/679.03 |
| 2014/0154989 A1 | 6/2014 | Lane | | |
| 2014/0355806 A1 | 12/2014 | Graff | | |
| 2015/0195635 A1 * | 7/2015 | Garfio | ...................... | H04R 1/02 381/386 |
| 2015/0289607 A1 | 10/2015 | Lee et al. | | |
| 2016/0037253 A1 * | 2/2016 | Workman | ............ | H04R 1/2834 381/338 |
| 2016/0037841 A1 * | 2/2016 | Dey | ........................ | A41D 20/00 2/170 |

(Continued)

FOREIGN PATENT DOCUMENTS

JP    H10336097 A    12/1998

OTHER PUBLICATIONS https://en.wikipedia.org/wiki/Glass-filled_polymer.*

(Continued)

*Primary Examiner* — Vivian Chin
*Assistant Examiner* — Ammar Hamid
(74) *Attorney, Agent, or Firm* — Hoffman Warnick LLC

(57) ABSTRACT

A portable loudspeaker includes an enclosure that defines an acoustic cavity. An electro-acoustic transducer is disposed within the acoustic cavity. A strap is provided which has a first end that is fixedly coupled to the enclosure and a second end that is releasably coupled to the enclosure. The second end of the strap is configured to be coupled to the enclosure (e.g., to secure an object therebetween). The second end of the strap is also configured be coupled to another portion of the strap to form a closed loop.

31 Claims, 7 Drawing Sheets

(56) References Cited

U.S. PATENT DOCUMENTS

2016/0204400 A1* 7/2016 Baek .................. B60L 11/1879
　　　　　　　　　　　　　　　　　　　　　　　　429/159
2017/0195763 A1* 7/2017 Cheney ................ H04R 1/026
2017/0359653 A1* 12/2017 Barone .................. H04R 5/00

OTHER PUBLICATIONS https://www.beoplay.com/products/beolitl7.*
https://www.verizonwireless.com/accessories/ultimate-ears-roll/%20accessed%20April%205,%202017.*
Ultimate Ears Roll Wireless Speaker—Verizon Wireless, https://www.verizonwireless.com/accessories/ultimate-ears-roll/ accessed Apr. 5, 2017.
JBL Clip+|Rugged, Splashproof Bluetooth Speaker, http://www.jbl.com/bluetooth-speakers/JBL+CLIP+PLUS.html?dwvar_JBL%20CLIP%20PLUS_color=Black accessed Apr. 5, 2017.
PCT Invitation to Pay Additional Fees, and Partial Search Results in connection with corresponding PCT Application No. PCT/US2018/026437 dated Jun. 11, 2018, 14 pages.

* cited by examiner

PORTABLE LOUDSPEAKERS

RELATED APPLICATION

This application claims benefit from U.S. Provisional Patent Application No. 62/482,437, filed Apr. 6, 2017 and titled "Portable Loudspeakers," the contents of which are incorporated herein by reference.

BACKGROUND

This disclosure relates to audio devices, and in particular to portable loudspeakers.

Some portable loudspeakers are known to include attachments points for securing the loudspeakers to objects. One example of such a loudspeaker incorporates a bungee cord that is tethered at both ends to a first side of a housing to form a closed loop. A hook is provided at the opposite side of the speaker package for capturing the loop. This allows the speaker to be attached to an object by looping the bungee cord around the object and securing the loop to the hook, thereby capturing the object between the speaker package and the bungee cord.

Another known loudspeaker includes a built-in carabiner clip which can be used to hook the speaker to an object. The carabiner clip is a relatively rigid structure and does not stretch to conform to the object it is attached to. The rigidity of the clip can limit the objects that it can attach to.

SUMMARY

All examples and features mentioned below can be combined in any technically possible way.

In one aspect, a portable loudspeaker includes an enclosure that defines an acoustic cavity. An electro-acoustic transducer is disposed within the acoustic cavity. A strap is provided which has a first end that is fixedly coupled to the enclosure and a second end that is releasably coupled to the enclosure (e.g., to secure an object therebetween). The second end of the strap is also configured be coupled to another portion of the strap to form a closed loop.

Implementations may include one of the following features, or any combination thereof.

In some implementations, the strap includes a first aperture, and a hook that is configured to releasably engage the first aperture.

In certain implementations, the enclosure includes a second aperture for releasably receiving the hook.

In some examples, the portable loudspeaker includes a speaker grille that is disposed along a rear surface of the enclosure. The strap overlies the speaker grille when the second end of the strap is secured to the enclosure.

In certain examples, the speaker grille is disposed in a recess formed along the rear surface of the enclosure, and the strap overlies the speaker grille in a non-contact manner when the second end of the strap is secured to the enclosure.

In some cases, the portable loudspeaker includes a plurality of feet that extend outwardly from the rear surface of the enclosure. The feet are configured to provide a gap to allow air flow to and from the speaker grille when the loudspeaker is placed, with the rear surface of the enclosure facing down, on a flat surface.

In certain cases, the strap extends between two pairs of the feet when the second end of the strap is secured to the enclosure.

In some implementations, the strap has a flat configuration which allows it to rest along the rear surface of the enclosure without interfering with the function of the feet.

In certain implementations, the arrangement of the feet assists in centering an object over the speaker grille when the second end of the strap is secured to the enclosure with the object disposed between the strap and the enclosure.

In some examples, the portable loudspeaker includes a plurality of feet that extend outwardly from the rear surface of the enclosure. The strap extends between two pairs of the feet when the second end of the strap is secured to the enclosure.

In certain examples, the arrangement of the feet assists in centering an object along the rear surface of the enclosure when the second end of the strap is secured to the enclosure with the object disposed between the strap and the enclosure.

In some cases, the strap is formed of silicone.

In some implementations, the strap is formed of a silicone material; and a glass filled plastic that is insert molded into the silicone material.

In certain implementations, the glass filled plastic is disposed at the first and second ends of the strap and is arranged such that the silicone material is coupled to the enclosure via the glass filled plastic.

In certain cases, the portable loudspeaker includes first and second passive radiators, which are arranged on opposite sides of the acoustic cavity. The electro-acoustic transducer is arranged such that acoustic energy radiated from the electro-acoustic transducer acoustically energizes the first and second passive radiators.

In some implementations, the first and second passive radiators are arranged to vibrate acoustically in phase with each other and mechanically out of phase with each other.

In certain implementations, the enclosure includes a first enclosure portion and a second enclosure portion, which together define the acoustic cavity, and a first side of the electro-acoustic transducer is secured to the first enclosure portion and a second, opposite side of the electro-acoustic transducer is secured to the second enclosure portion.

In some examples, the first enclosure portion defines a front surface of the enclosure, and the second enclosure portion defines a rear surface of the enclosure, and wherein the electro-acoustic transducer is arranged such that its motion axis is substantially perpendicular to the front and rear surfaces.

In certain examples, the electro-acoustic transducer is secured to the first enclosure portion with fasteners. The electro-acoustic transducer is secured to the second enclosure portion with an adhesive.

In another aspect, a portable loudspeaker includes an enclosure that defines an acoustic cavity. An electro-acoustic transducer is disposed within the acoustic cavity. A strap is provided which has a first end that is fixedly coupled to the enclosure and a second end that is releasably coupled to the enclosure. The strap is formed of a silicone material; and a glass filled plastic that is insert molded into the silicone material. The glass filled plastic is disposed at the first and second ends of the strap and is arranged such that the silicone material is coupled to the enclosure via the glass filled plastic.

Implementations may include one of the above features, or any combination thereof.

DETAILED DESCRIPTION

This disclosure is based, at least in part, on the realization that it may be beneficial to provide a portable loudspeaker with an attachment point that allows for some flexibility in how the portable loudspeaker can be coupled to an object.

Figure 1A:
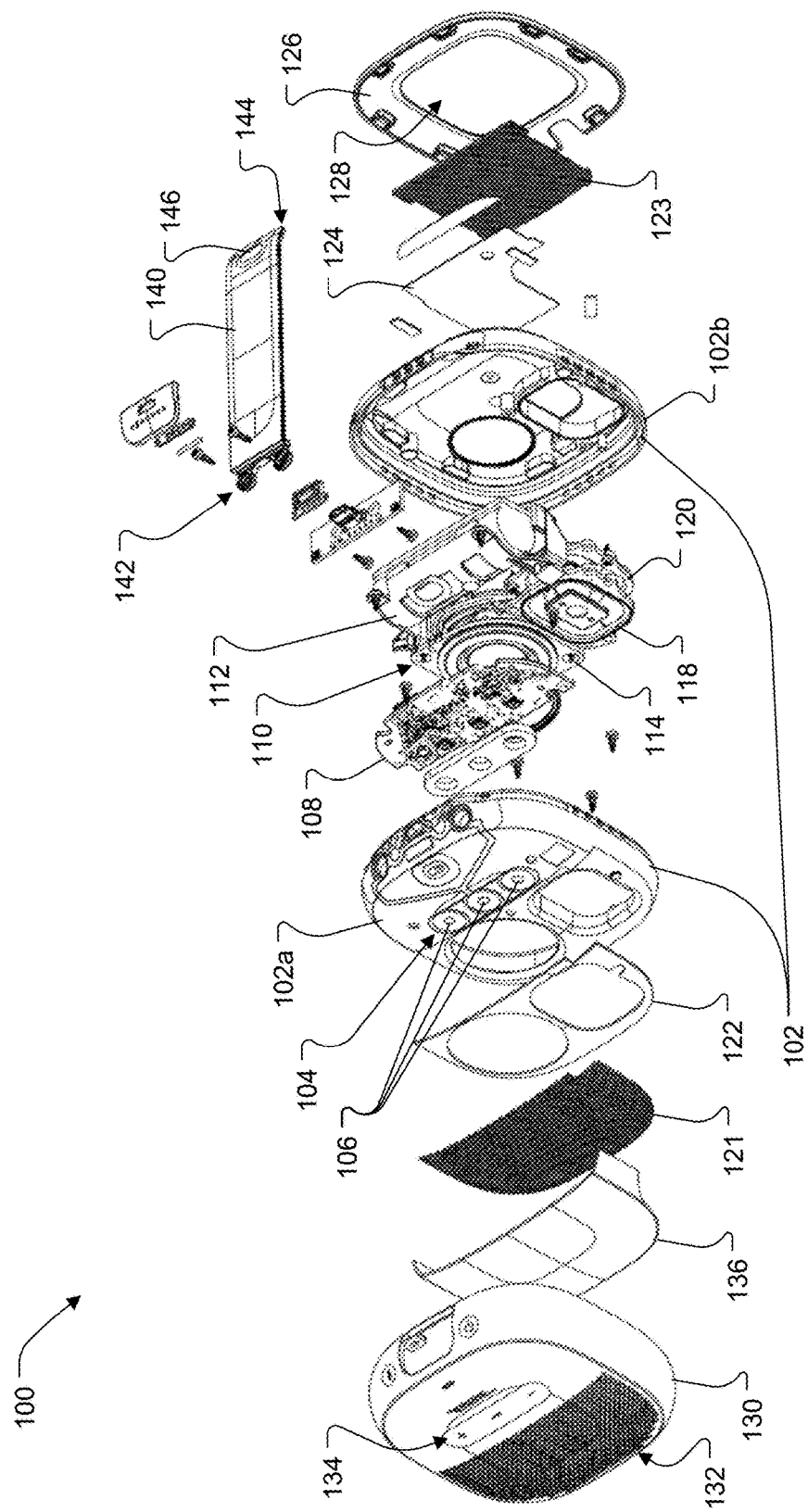
FIGS. 1A & 1B are front and rear exploded perspective views, respectively, of a portable loudspeaker.
Figure 1B:
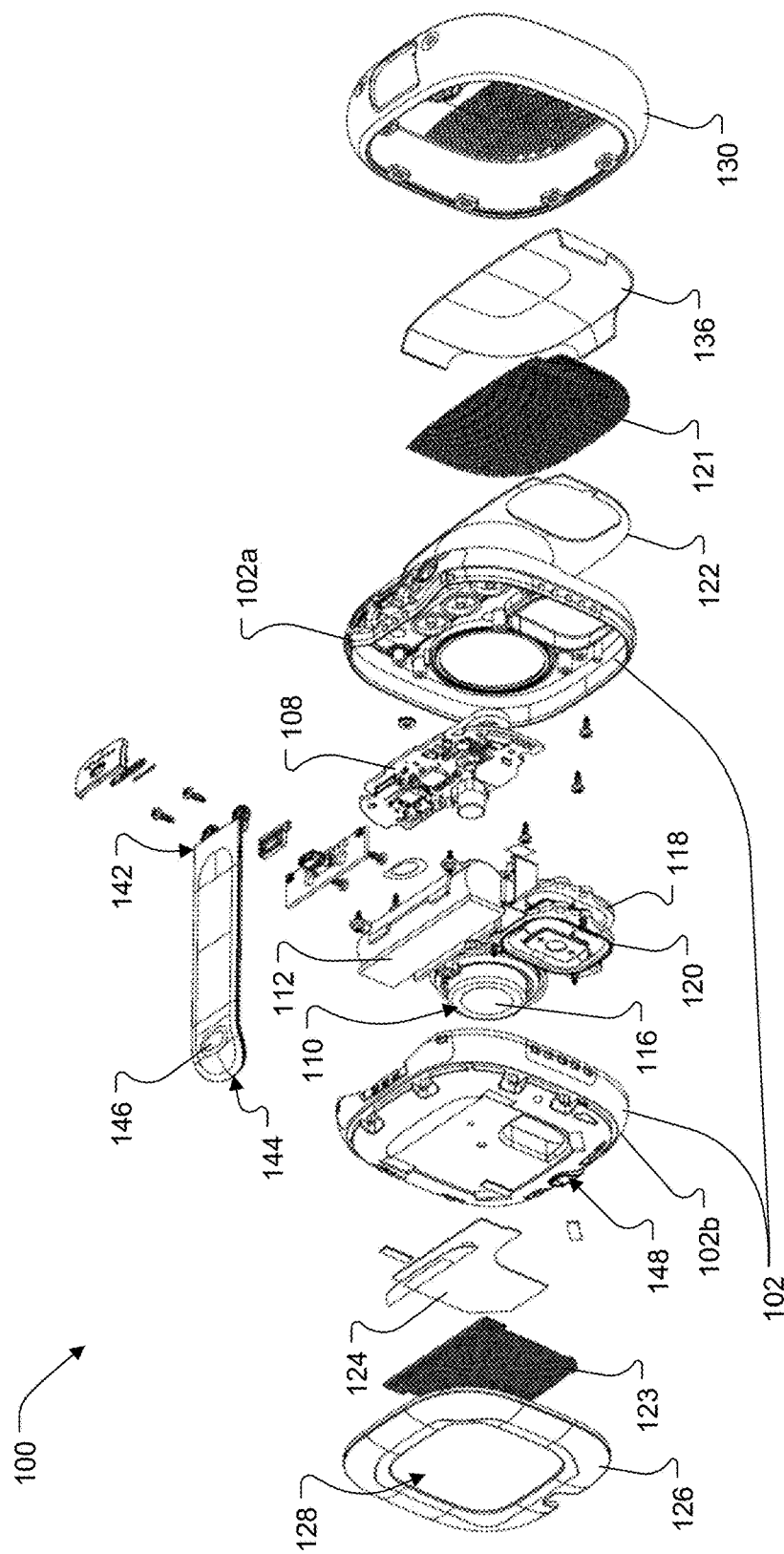

Referring to FIGS. 1A & 1B, a portable loudspeaker 100 includes an enclosure 102 having a first enclosure portion 102a and a second enclosure portion 102b, which together define an acoustic cavity. The first and second enclosure portions consist primarily of a hard, plastic shell. The first enclosure portion 102a includes a small region of elastomer 104, which is formed to the hard, plastic shell to create an air tight seal at the junction therebetween. The elastomer 104 defines a plurality of buttons 106 which the user can press to control features such as volume and power. The buttons 106 overly respective switches which are mounted on a printed circuit board (PCB) 108.

The PCB 108 resides within the acoustic cavity. The PCB 108 can support various electronics for the loudspeaker 100 such as a wireless receiver (e.g., Bluetooth receiver) for receiving stream audio signals, one or more digital signal processors (DSPs) for processing digital audio streams, and one or more digital-to-analog converters for converting digital audio streams to analog form for the transduction by the electro-acoustic transducer 110. A battery 112 is also enclosed within the acoustic cavity for powering the electronics and an electro-acoustic transducer 110.

A frame 114 along a first side of the electro-acoustic transducer 110 is secured to the first enclosure portion 102a, e.g., via fasteners. A second, opposite side of the electro-acoustic transducer 110 (e.g., a motor structure 116 of the transducer) is secured to the second enclosure portion 102b, e.g., using an adhesive, such that the electro-acoustic transducer 110 is sandwiched between and fixedly coupled to both the first and second enclosure portions 102a, 102b. The electro-acoustic transducer 110 is arranged such that its motion axis is substantially perpendicular to the front and rear surfaces of the enclosure 102. This coupling of the opposing sides of the electro-acoustic transducer 110 to the enclosure 102 changes the rocking mode of the electro-acoustic transducer 110 and can help to push the rocking mode up to higher frequencies.

The electro-acoustic transducer 110 resides within the acoustic cavity and is arranged such that acoustic energy radiated from the electro-acoustic transducer 110 acoustically energizes a pair of passive radiators (i.e., first and second passive radiators 118, 120). Each of the first and second passive radiators 118, 120 is mounted, e.g., via fasteners (e.g., screws), to a corresponding one of the first and second enclosure portions 102a, 102b. The first and second passive radiators 118, 120 are driven with parallel and preferably coaxial, directions of motion which are acoustically in phase with each other and mechanically out of phase with each other. Using two passive radiators within a single enclosure can be advantageous because the inertial forces associated with passive radiators may be made to cancel, and the size of each individual passive radiator may be made smaller. This is especially advantageous for small, highly portable devices, since the surface area of the enclosure of such devices may not be large enough to accommodate a single passive radiator.

A first speaker grille 121 is mounted to an outer surface of the first enclosure portion 102a (a/k/a the front surface of the enclosure) via a double sided foam tape 122. The foam helps take up the tolerances between the first speaker grille 121 and the enclosure 102. A second speaker grille 123 is supported along an outer surface of the second enclosure portion 102b (a/k/a the rear surface of the enclosure). A piece of flocking material 124 is provided between the second speaker grille 123 and the enclosure 102. The flocking material 124 is a thin, felt-like material with an adhesive backing, which helps to prevent the second speaker grille 123 from buzzing against the enclosure 102. In some cases, the first and second speaker grilles 121, 123 are made of thin steel and include micro-perforations for acoustic transparency.

A back cover 126 is mounted to the rear surface of the enclosure 102 and surrounds the second speaker grille 123. An opening 128 is provided in the back cover 126 so that the second speaker grille 123 remains exposed. A boot 130 covers the front surface and sides of the enclosure 102. The boot 130 includes a perforated region 132 that overlies the first speaker grille 121 and allows for acoustic energy to pass therethrough. The boot 130 also includes a button region 134 that overlies the buttons 106 on the first enclosure portion 102a. The boot 130 may be formed of an elastomer or rubber. An open cell foam 136 is provided between the first speaker grille 121 and the boot 130 to prevent the boot 130 from buzzing against the first speaker grille 121.

Figure 2A:
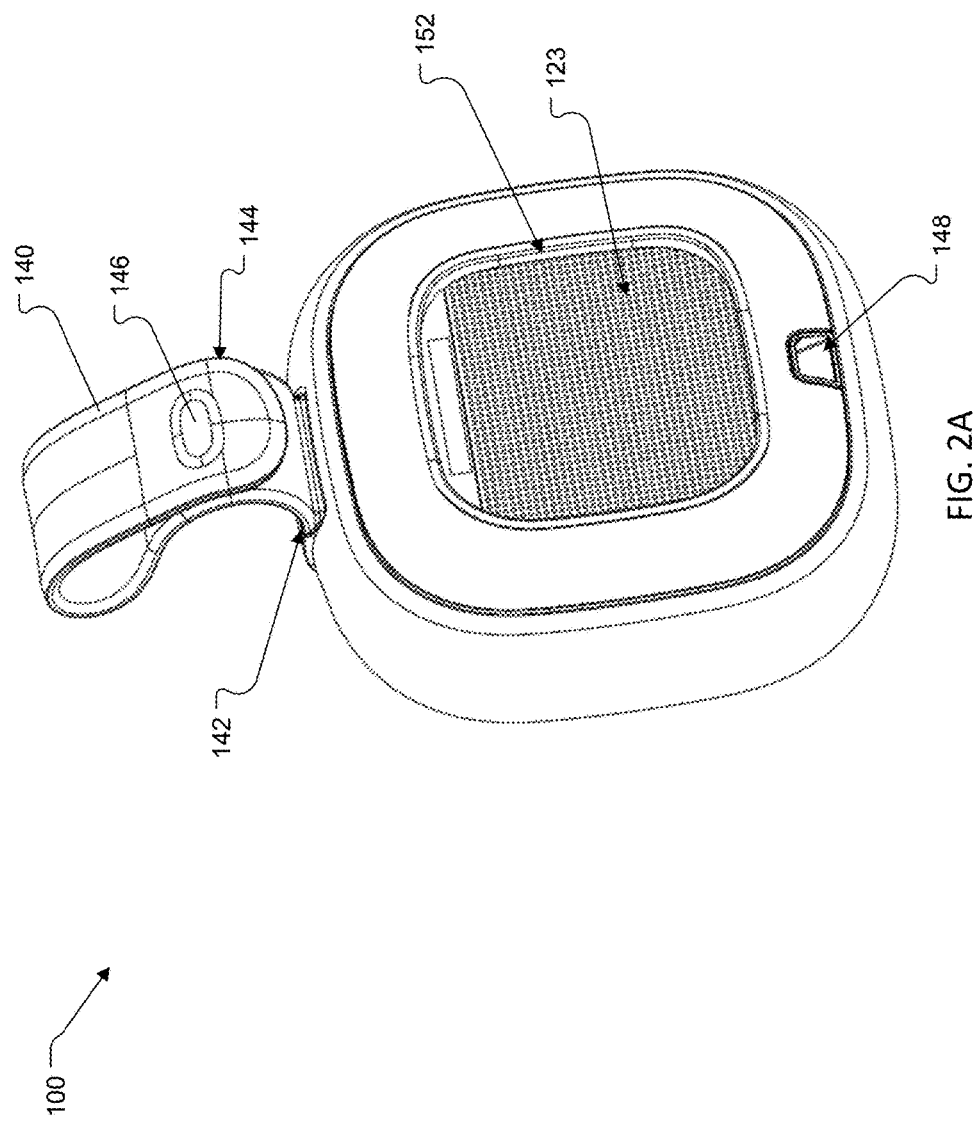
FIGS. 2A & 2B are rear and front perspective views, respectively, of the portable loudspeaker of FIGS. 1A & 1B, showing an attachment strap in a first orientation.
Figure 2B:
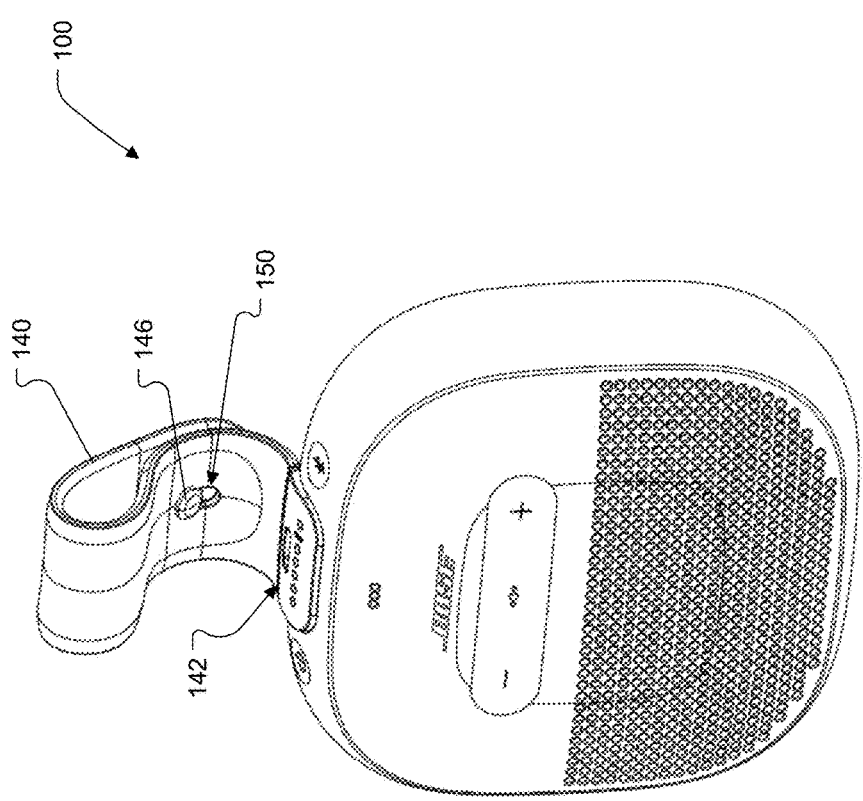

Notably, the loudspeaker 100 incorporates an attachment point for coupling to a belt loop, backpack, or handlebar. The attachment point includes a silicone strap 140. The strap 140 is fixedly secured at a first end 142 to the enclosure 102 via fasteners (screws). An opposite (distal) end 144 of the strap 140 includes a hook 146, which may be formed of a rigid material, such as a hard plastic or metal, for releasably engaging an aperture 148 (FIGS. 1B & 2A) formed on the rear surface of the enclosure 102. This allows the loudspeaker 100 to be secured to an object by capturing the object between the strap 140 and the rear surface of the enclosure 102. The compliant nature of the silicone allows the strap 140 to conform and accommodate objects of different shapes and sizes while still holding the loudspeaker 100 tautly attached thereto. In addition, another aperture 150 (FIG. 2B) for receiving the hook 146 is provided in the strap 140 thereby allowing the strap 140 to be attached to itself in a closed loop, as shown in FIGS. 2A & 2B, for securing the strap 140 alone to an object such as a handlebar or a shower curtain rod. Thus, the attachment point of the loudspeaker 100 provides the flexibility of two forms of attachment.

Figure 3A:
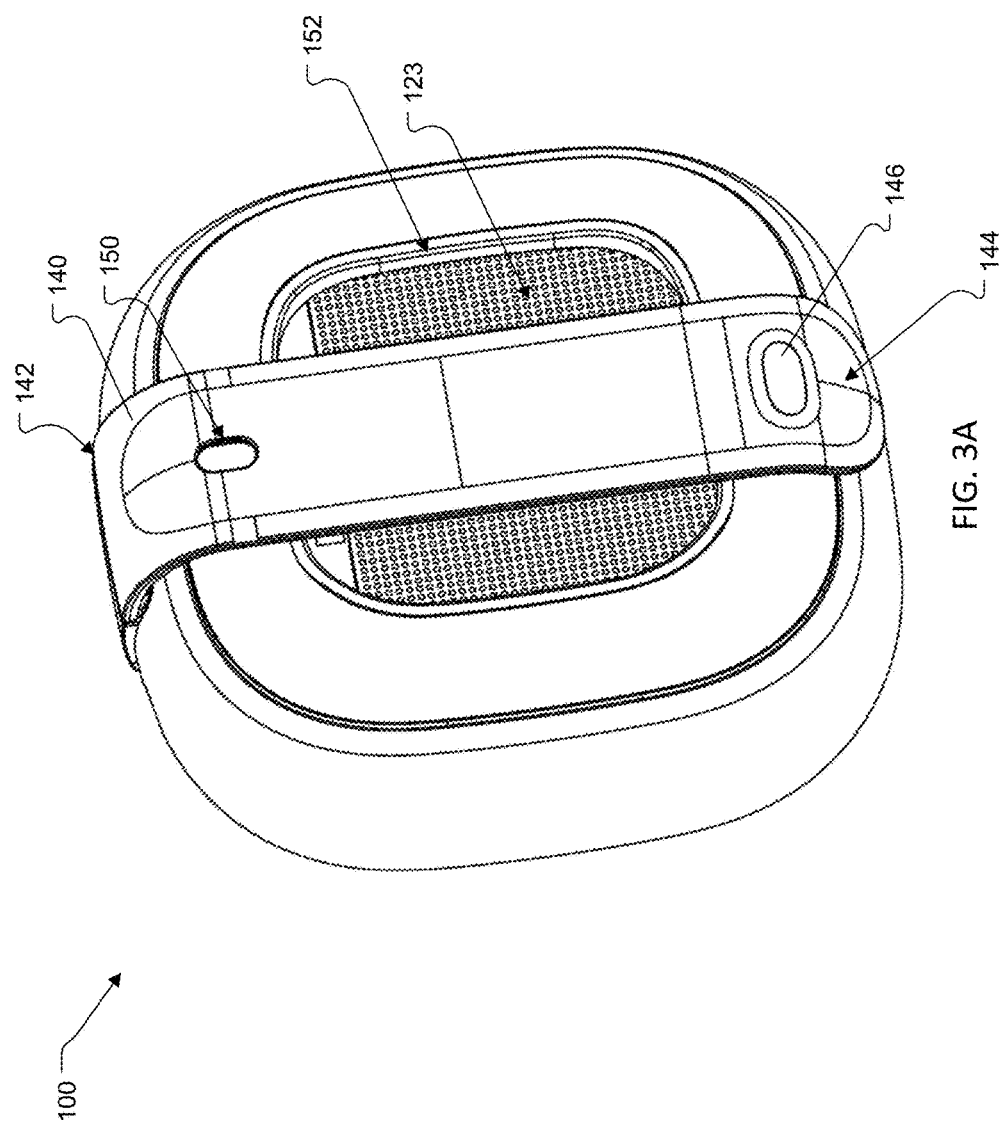
FIG. 3A is a rear perspective view of the portable loudspeaker of FIGS. 1A & 1B, showing the attachment strap in a second orientation.

Another unique feature of the attachment point relates to how the strap 140 rests along the rear surface of the enclosure 102 when its distal end is attached to the enclosure 102, as shown in FIG. 3A, in the absence of any object. That is, when the loudspeaker 100 is detached from any object, it is expected that the distal end of the strap 140 will be connected to the enclosure 102 (i.e., the hook 146 will be engaged with the aperture 148 in the enclosure 102). In this configuration, the strap 140 will rest along the rear surface of the enclosure 102 overlying the second speaker grille 123. The compliant nature of the silicone will hold the strap in a relatively taut condition such that it does not contact the second speaker grille 123, which is disposed in a recess 152 formed along the rear surface of the enclosure 102 by the opening 128 in the back cover 126.

Figure 3C:
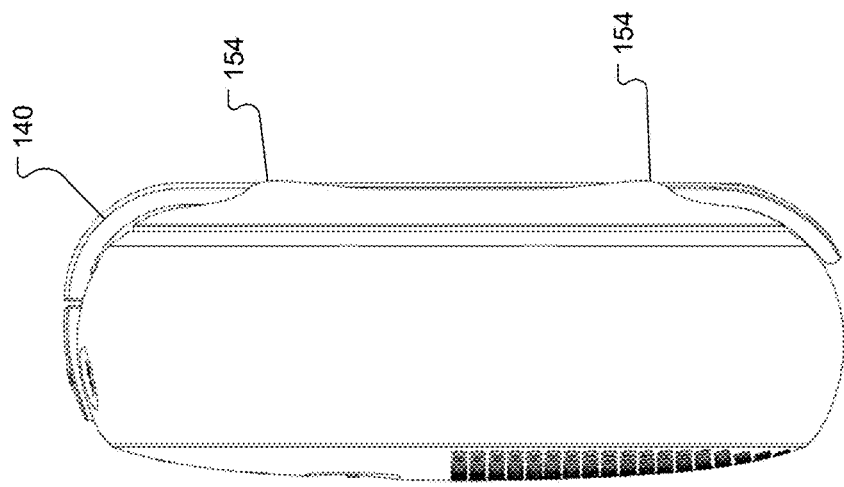
FIGS. 3B & 3C are top and side views, respectively, of the portable loudspeaker of FIGS. 1A & 1B, showing the strap in second orientation.
Figure 3B:
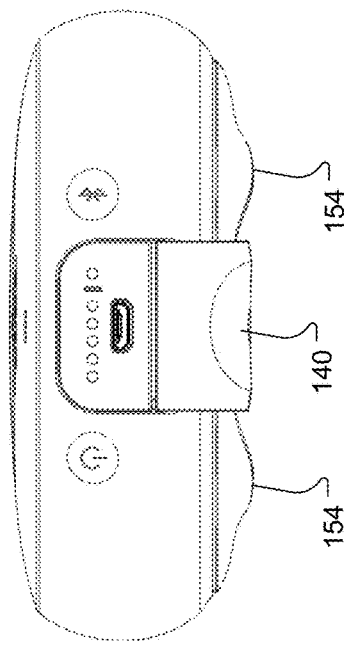

In this position the strap 140 will lie between two pairs of feet 154 (FIGS. 3B & 3C) that are formed in the back cover 126 and which extend outwardly from the rear surface of the enclosure 102. The feet 154 (a/k/a "contact points") help to ensure that a gap is provided to allow air flow to and from the second speaker grille 123 when the loudspeaker 100 is placed (rear surface down) on a flat surface, such as a table. The flat configuration of the strap 140 allows it to rest along the rear surface of the enclosure 102 without interfering with the function of the feet 154.

The arrangement of the feet 154 can also assist in centering an object over the second speaker grille 123 when the second end of the strap 140 is secured to the enclosure 102 with the object disposed between the strap 140 and the enclosure 102. And, the provision of the recess 152 for the second speaker grille 123 allows for such an attachment to be made without occluding air flow to or from the second speaker grille 123.

Figure 4A:
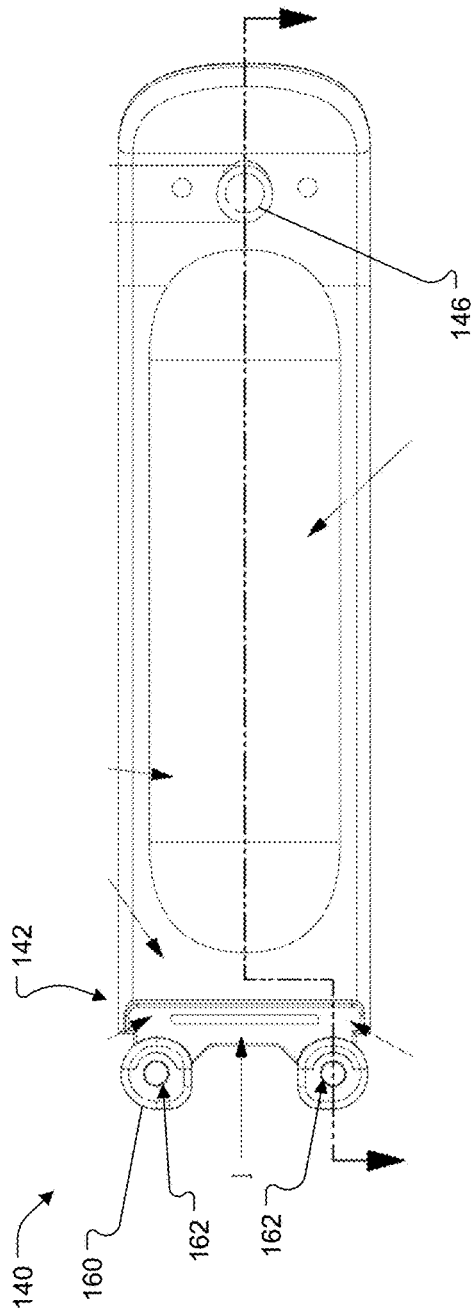
FIGS. 4A & 4B are bottom and cross-sectional side views, respectively, of the attachment strap.
Figure 4B:
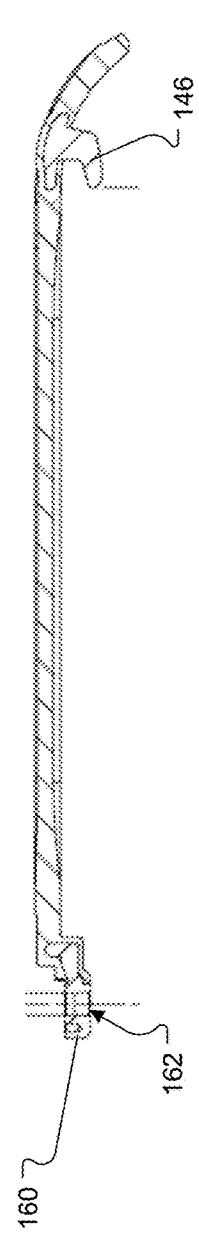

Referring to FIGS. 4A and 4B, the strap 140 consists of two materials; silicone for its compliance to stretch around different geometries and a glass filled plastic that is insert molded into the silicone for strength in the regions where the strap 140 is coupled to the enclosure 102 (i.e., at the first end 142 and at the hook 146). A first glass filled plastic part 160 is disposed at the first end 142 of the strap 140 and includes through holes 162, which accommodate fasteners for securing the strap 140 to the enclosure 102. The hook 146 is also formed of glass filled plastic. The glass filled plastic components and the silicone material are chemically bonded together so that they behave as one part, thereby inhibiting delamination when the strap 140 is being pulled or distorted. A strap that consists exclusively of an elastomer may not function well as the coupling regions are stretched out.

A number of implementations have been described. Nevertheless, it will be understood that additional modifications may be made without departing from the scope of the inventive concepts described herein, and, accordingly, other implementations are within the scope of the following claims.

What is claimed is:
1. A portable loudspeaker comprising:
an enclosure that defines an acoustic cavity;
an electro-acoustic transducer disposed within the acoustic cavity;
a strap having a first end that is fixedly coupled to the enclosure and a second end that is releasably coupled to the enclosure;
a speaker grille disposed along a rear surface of the enclosure, wherein the strap overlies the speaker grille when the second end of the strap is secured to the enclosure,
wherein the speaker grille is disposed in a recess formed along the rear surface of the enclosure, and
wherein the strap overlies the speaker grille in a non-contact manner when the second end of the strap is secured to the enclosure.
2. The portable loudspeaker of claim 1, wherein the strap comprises a first aperture, and a hook configured to releasably engage the first aperture.
3. The portable loudspeaker of claim 2, wherein the enclosure includes a second aperture for releasably receiving the hook.
4. The portable loudspeaker of claim 1, further comprising a plurality of feet that extend outwardly from the rear surface of the enclosure, wherein the feet are configured to provide a gap to allow air flow to and from the speaker grille when the loudspeaker is placed, with the rear surface of the enclosure facing down, on a flat surface.
5. The portable loudspeaker of claim 4, wherein the strap extends between two pairs of the feet when the second end of the strap is secured to the enclosure.
6. The portable loudspeaker of claim 4, wherein the strap has a flat configuration which allows it to rest along the rear surface of the enclosure without interfering with the function of the feet.
7. The portable loudspeaker of claim 4, wherein the arrangement of the feet assists in centering an object over the speaker grille when the second end of the strap is secured to the enclosure with the object disposed between the strap and the enclosure.
8. The portable loudspeaker of claim 1, further comprising a plurality of feet that extend outwardly from the rear surface of the enclosure, wherein the strap extends between two pairs of the feet when the second end of the strap is secured to the enclosure.
9. The portable loudspeaker of claim 8, wherein the arrangement of the feet assists in centering an object along the rear surface of the enclosure when the second end of the strap is secured to the enclosure with the object disposed between the strap and the enclosure.
10. The portable loudspeaker of claim 1, wherein the strap is formed of an elastomer.
11. The portable loudspeaker of claim 1, wherein the strap comprises a silicone material; and a glass filled plastic that is insert molded into the silicone material.
12. The portable loudspeaker of claim 11, wherein the glass filled plastic is disposed at the first and second ends of the strap and is arranged such that the silicone material is coupled to the enclosure via the glass filled plastic.
13. The portable loudspeaker of claim 1, further comprising first and second passive radiators arranged on opposite sides of the acoustic cavity, wherein the electro-acoustic transducer is arranged such that acoustic energy radiated from the electro-acoustic transducer acoustically energizes the first and second passive radiators.
14. The portable loudspeaker of claim 13, wherein the first and second passive radiators are arranged to vibrate acoustically in phase with each other and mechanically out of phase with each other.
15. The portable loudspeaker of claim 1, wherein the enclosure comprises a first enclosure portion and a second enclosure portion, which together define the acoustic cavity, and wherein a first side of the electro-acoustic transducer is secured to the first enclosure portion and a second, opposite side of the electro-acoustic transducer is secured to the second enclosure portion.
16. The portable loudspeaker of claim 15, wherein the first enclosure portion defines a front surface of the enclosure, and the second enclosure portion defines the rear surface of the enclosure, and wherein the electro-acoustic transducer is arranged such that its motion axis is substantially perpendicular to the front and rear surfaces.
17. The portable loudspeaker of claim 15, wherein the electro-acoustic transducer is secured to the first enclosure portion with fasteners, and wherein the electro-acoustic transducer is secured to the second enclosure portion with an adhesive.
18. A portable loudspeaker comprising:
an enclosure that defines an acoustic cavity;

an electro-acoustic transducer disposed within the acoustic cavity;

a strap having a first end that is fixedly coupled to the enclosure and a second end that is releasably coupled to the enclosure, wherein the strap comprises a silicone material; and a glass filled plastic that is insert molded into the silicone material, and wherein the glass filled plastic is disposed at the first and second ends of the strap and is arranged such that the silicone material is coupled to the enclosure via the glass filled plastic; and a speaker grille disposed along a rear surface of the enclosure, wherein the strap overlies the speaker grille when the second end of the strap is secured to the enclosure, wherein the speaker grille is disposed in a recess formed along the rear surface of the enclosure, and wherein the strap overlies the speaker grille in a non-contact manner when the second end of the strap is secured to the enclosure.

19. The portable loudspeaker of claim 18, further comprising a plurality of feet that extend outwardly from the rear surface of the enclosure, wherein the feet are configured to provide a gap to allow air flow to and from the speaker grille when the loudspeaker is placed, with the rear surface of the enclosure facing down, on a flat surface.

20. The portable loudspeaker of claim 19, wherein the strap extends between two pairs of the feet when the second end of the strap is secured to the enclosure.

21. The portable loudspeaker of claim 19, wherein the strap has a flat configuration which allows it to rest along the rear surface of the enclosure without interfering with the function of the feet.

22. The portable loudspeaker of claim 19, wherein the arrangement of the feet assists in centering an object over the speaker grille when the second end of the strap is secured to the enclosure with the object disposed between the strap and the enclosure.

23. The portable loudspeaker of claim 18, further comprising a plurality of feet that extend outwardly from the rear surface of the enclosure, wherein the strap extends between two pairs of the feet when the second end of the strap is secured to the enclosure.

24. The portable loudspeaker of claim 23, wherein the arrangement of the feet assists in centering an object along the rear surface of the enclosure when the second end of the strap is secured to the enclosure with the object disposed between the strap and the enclosure.

25. The portable loudspeaker of claim 18, wherein the enclosure comprises a first enclosure portion and a second enclosure portion, which together define the acoustic cavity, and wherein a first side of the electro-acoustic transducer is secured to the first enclosure portion and a second, opposite side of the electro-acoustic transducer is secured to the second enclosure portion.

26. The portable loudspeaker of claim 25, wherein the first enclosure portion defines a front surface of the enclosure, and the second enclosure portion defines a rear surface of the enclosure, and wherein the electro-acoustic transducer is arranged such that its motion axis is substantially perpendicular to the front and rear surfaces.

27. The portable loudspeaker of claim 25, wherein the electro-acoustic transducer is secured to the first enclosure portion with fasteners, and wherein the electro-acoustic transducer is secured to the second enclosure portion with an adhesive.

28. A portable loudspeaker comprising:

an enclosure that defines an acoustic cavity;

an electro-acoustic transducer disposed within the acoustic cavity;

a strap having a first end that is fixedly coupled to the enclosure and a second end that is releasably coupled to the enclosure;

a speaker grille disposed along a rear surface of the enclosure, wherein the strap overlies the speaker grille when the second end of the strap is secured to the enclosure; and a plurality of feet that extend outwardly from the rear surface of the enclosure, wherein the feet are configured to provide a gap to allow air flow to and from the speaker grille when the loudspeaker is placed, with the rear surface of the enclosure facing down, on a flat surface, wherein the strap extends between two pairs of the feet when the second end of the strap is secured to the enclosure.

29. The portable loudspeaker of claim 28, wherein the enclosure comprises a first enclosure portion and a second enclosure portion, which together define the acoustic cavity, and wherein a first side of the electro-acoustic transducer is secured to the first enclosure portion and a second, opposite side of the electro-acoustic transducer is secured to the second enclosure portion.

30. The portable loudspeaker of claim 29, wherein the first enclosure portion defines a front surface of the enclosure, and the second enclosure portion defines the rear surface of the enclosure, and wherein the electro-acoustic transducer is arranged such that its motion axis is substantially perpendicular to the front and rear surfaces.

31. The portable loudspeaker of claim 29, wherein the electro-acoustic transducer is secured to the first enclosure portion with fasteners, and wherein the electro-acoustic transducer is secured to the second enclosure portion with an adhesive.

* * * * *